United States Patent
Kono et al.

[11] Patent Number: 5,917,693
[45] Date of Patent: Jun. 29, 1999

[54] ELECTRICALLY CONDUCTIVE POLYMER COMPOSITION

[75] Inventors: Michiyuki Kono, Osaka; Shigeo Mori, Kyoto, both of Japan

[73] Assignee: Dai-Ichi Kogyo Seiyaku Co., Ltd., Kyoto, Japan

[21] Appl. No.: 08/949,583

[22] Filed: Oct. 14, 1997

Related U.S. Application Data

[63] Continuation of application No. 08/785,714, Jan. 17, 1997, abandoned, which is a continuation of application No. 08/558,910, Nov. 9, 1995, abandoned, which is a continuation of application No. 08/117,887, Sep. 7, 1993, abandoned, which is a division of application No. 07/966,808, Oct. 26, 1992, abandoned.

[51] Int. Cl.$^6$ .......................... H01M 10/40; H01G 9/025
[52] U.S. Cl. .......................... 361/525; 361/527; 429/212
[58] Field of Search ................... 429/212, 213; 361/524, 525, 527

[56] References Cited

U.S. PATENT DOCUMENTS

| | | | |
|---|---|---|---|
| 4,681,822 | 7/1987 | Berthier et al. | 429/213 X |
| 4,810,400 | 3/1989 | Shinozaki et al. | 252/62.2 |
| 4,940,640 | 7/1990 | Macdiarmid | 429/213 |
| 4,999,263 | 3/1991 | Kabata et al. | 429/131 |
| 5,006,278 | 4/1991 | Eisenbaumer | 252/500 |
| 5,019,949 | 5/1991 | Ikeda et al. | 361/525 |
| 5,130,886 | 7/1992 | Kishimoto | 361/525 |
| 5,183,543 | 2/1993 | Toyosawa et al. | 252/500 |
| 5,326,657 | 7/1994 | Suga et al. | 429/192 |
| 5,538,813 | 7/1996 | Li | 429/192 |

FOREIGN PATENT DOCUMENTS

| | | |
|---|---|---|
| 0432929 | 6/1991 | European Pat. Off. |
| 63-158829 | 7/1988 | Japan . |
| 3-28229 | 2/1991 | Japan . |
| 3-35516 | 2/1991 | Japan . |

OTHER PUBLICATIONS

"Spectroscopic Studies of Soluble Poly (3–alkylthienylenes)", by S. Hotta et al Macromolecules, (1987), vol. 20, pp. 212–215.

The 27th Battery Symposium in Japan; Osaka, Japan; Nov. 25–27, 1986.

*Primary Examiner*—Stephen Kalafut
*Attorney, Agent, or Firm*—Jordan and Hamburg LLP

[57] ABSTRACT

The electrically conductive polymer composition of this invention comprises (A) a polyaniline, (B) at least one member selected from the class consisting of homopolymers, block copolymers and random copolymers of alkylene oxide monomers and crosslinking products thereof, and (C) at least one member selected from the class consisting of protonic acid anions, electron acceptors, alkali metal salts and alkaline earth metal salts. This composition affords a choice of electronic conductance or ionic conductance, or both, according to the intended application. Furthermore, since it is highly processable and flexible, the composition finds application in a variety of uses.

1 Claim, 1 Drawing Sheet

Fig. 1

ELECTRICALLY CONDUCTIVE POLYMER COMPOSITION

This application is a continuation of application Ser. No. 08/785,714 filed Jan. 17, 1997, now abandoned, which is a continuation of application Ser. No. 08/558,910 filed Nov. 9, 1995, now abandoned, which is a continuation of application Ser. No. 08/117,887 filed Sep. 7, 1993, now abandoned, which is a divisional of application Ser. No. 07/966,808 filed Oct. 26, 1992, now abandoned.

FIELD OF THE INVENTION

The present invention relates to a novel electrically conductive polymer composition which finds application in electric and electronic devices such as electric batteries, electrochromic display devices, capacitors, etc., or as an antistatic material or an electromagnetic shielding material.

BACKGROUND OF THE INVENTION

The hithereto-known electrically conductive substances in which electrons act as charge carriers include, among others, polyacetylene, polypyrrole, polythiophene, polyaniline, polyphenylenevinylene and so on. Among them, polypyrrole provides a comparatively high film strength and has, therefore, been used as the solid electrolyte for solid electrolyte capacitors (Japanese Kokai Patent Publication No. 63-158829). Polyaniline may undergo repeated doping and dedoping electrochemically and has a high degree of dopability as compared with other electrically conductive polymers, so that this compound has been utilized as the positive electrode active material of a secondary cell [The 27th Battery Symposium in Japan, 3A05L].

It is known that these polymers can be produced either by chemical oxidative polymerization using an oxidizing agent (chemical polymerization method) or by electrochemical oxidative polymerization (electrolytic polymerization method).

Chemical polymerization generally lends itself well to mass production. However, the resulting electrically conductive polymer is poor in moldability because it is available as a powder insoluble and/or infusible, and in order that it may be used as an electrically conductive material, the particulate polymer must be dispersed in a coating binder just as it is the case with conductive carbon or metal powders. Thus, there is no merit in the use of such a polymer in lieu of the latter time-honored materials.

On the other hand, electrolytic polymerization gives an electrically conductive polymer in the form of a film. However, while a high film strength can be obtained with certain polymers, typically polypyrrole, sufficient film strength cannot be obtained with others, such as polyaniline and polythiophene. Moreover, as the common drawbacks of the electrically conductive polymers synthesized by the electrolytic polymerization method, the size of the electrically conductive polymer film is limited by the size of the electrode used for electrolysis and, moreover, in order that such a film may be deposited on an insulating support, formation of an electrically conductive precoating layer is essential. Owing to these disadvantages, it has heretofore been difficult to obtain an electrically conductive polymer film or layer having a sufficiently large surface area.

Recently, it has been proposed to overcome these disadvantages by synthesizing a solvent-soluble or thermoplastic electrically conductive polymer by polymerizing a monomer having an alkyl or alkoxy group in the 3-position of a 5-membered heterocyclic nucleus such as pyrrole or thiophene [Macromolecules, 20, 212 (1987)]. Among compounds in this category, polythiophene derivatives are very satisfactory in processability but are poor in the stability of electrical conductivity. On the other hand, polypyrrole derivatives are disadvantageous in that the cost of monomers is high and their synthesis involves difficulties in many instances.

More recently, it has been discovered that the polyaniline synthesized by chemical polymerization can be rendered soluble by subjecting it to dedoping [Japanese Kokai Patent Publication No. 3-28229]. This polyaniline not only yields a tough film on heat treatment but gives a self-supporting film having a high electrical conductivity on redoping. When these merits are considered in conjunction with the procedural ease of polymerization, this is a very satisfactory polymer. However, when it is coated, for example as an antistatic agent, on a heterogenous substrate, there occurs the problem of poor adhesion or low flexibility and the use of a binder for obviating these difficulties sacrifices the inherent electrical conductivity of polyaniline.

Meanwhile, this soluble polyaniline can be utilized as a positive electrode active substance for secondary batteries. Because this soluble polyaniline can be made available in a variety of forms, electrode design is facilitated compared with the case in which the polyaniline prepared by the conventional chemical or electrolytic polymerization method is used as the positive electrode active substance. However, as the common problem with secondary cells utilizing polyaniline, polythiophene or polypyrrole as the positive electrode active substance, the diffusion of anions associated with charge and discharge is rate-determining and this is a major obstacle to be surmounted for the realization of large capacity secondary batteries. This problem cannot be overcome, either, even when said soluble polyaniline is used as the positive electrode active substance.

SUMMARY OF THE INVENTION

It is an object of the present invention to overcome the above-mentioned disadvantages and provide a novel electrically conductive polymer composition having a markedly improved moldability.

It is another object of the present invention to provide an electrically conductive polymer composition which has both electronic conductivity and ionic conductivity or either of them and, therefore, a great potential for use as a novel electrically conductive material.

The electrically conductive polymer composition of the present invention comprises
 (A) a polyaniline,
 (B) at least one member selected from the class consisting of the homopolymers, block copolymers and random copolymers of alkylene oxide monomers and the crosslinking products thereof; and
 (C) at least one member selected from the class consisting of protonic acid anions, electron acceptors, alkali metal salts and alkaline earth metal salts.

In the present invention, components (A) and (B) are dissolved in each other and molecularly dispersed to form a polymer alloy consisting of (A) and (B). Then, component (A) and/or component (B) in this polymer alloy is caused to form a complex with component (C). This complex exhibits electronic conductivity and/or ionic conductivity.

Furthermore, since components (A) and (B) are fully compatible, the polymer alloy they form has an interpenetrating polymer network (IPN) structure showing a high degree of flexibility not found in the film obtainable from component (A) alone.

In the following description of the present invention, the step of adding component (C) to either component (A) or component (B) or to an (A)–(B) alloy to form a complex will be referred to as "doping".

The polyaniline to be used as said component (A) in the present invention can be easily obtained by dispersing or dissolving aniline in a solvent, such as water, methanol or the like, adding an oxidizing agent, such as ammonium persulfate, hydrogen peroxide, manganese dioxide or the like, to the dispersion or solution in the presence of a protonic acid, such as sulfuric acid, hydrochloric acid or the like, conducting a polymerization reaction to obtain a doped polyaniline and, then, dedoping the same with a base such as ammonia, sodium hydroxide or the like. Optionally, the dedoped polyaniline can be reduced for use in the invention.

The homopolymer, block copolymer or random copolymer of monomeric alkylene oxide which is used as component (B) in the present invention (hereinafter referred to as "alkylene oxide polymer") can be generally obtained by subjecting an alkylene oxide to addition (ring-opening) polymerization with an active hydrogen compound.

The active hydrogen compound mentioned just above includes, inter alia, monohydric alcohols such as methanol, ethanol, etc., dihydric alcohols such as ethylene glycol, propylene glycol, 1,4-butanediol, etc., polyhydric alcohols such as glycerol, trimethylolpropane, sorbitol, sucrose, polyglycerol, etc., amines such as monoethanolamine, ethylenediamine, diethylenetriamine, 2-ethylhexylamine, hexamethylenediamine, etc., and phenolic active hydrogen compounds such as bisphenol A, hydroquinone and so on.

The alkylene oxide monomer includes, inter alia, α-olefin oxides containing 2 to 9 carbon atoms such as ethylene oxide, propylene oxide, 1,2-epoxybutane, 1,2-epoxypentane, 1,2-epoxyhexane, 1,2-epoxyheptane, 1,2-epoxyoctane, 1,2-epoxynonane, etc.; α-olefin oxides containing 10 or more carbon atoms; styrene oxide and so on, although ethylene oxide, propylene oxide and 1,2-epoxybutane are particularly preferred.

The polymerization reaction is carried out using a basic catalyst such as sodium methoxide, sodium hydroxide, potassium hydroxide, lithium carbonate, triethylamine, potassium t-butoxide, etc. or an acid catalyst such as perchloric acid, boron trifluoride, etc., although a basic catalyst is preferably employed.

The number average molecular weight of the alkylene oxide polymer is preferably in the range of 100 to 20,000.

The crosslinked alkylene oxide polymer, which can also be used as component (B) in the present invention, can be generally obtained by subjecting said alkylene oxide polymer to crosslinking reaction with a suitable crosslinking agent or, alternatively, by synthesizing an acryloyl- or methacryloyl-modified alkylene oxide polymer and crosslinking the same.

The method for crosslinking the alkylene oxide polymer with a crosslinking agent includes, inter alia, isocyanate crosslinking and ester crosslinking.

The crosslinking agent for use in the isocyanate crosslinking method includes, inter alia, 2,4-tolylene diisocyanate (2,4-TDI), 2,6-tolylene diisocyanate (2,6-TDI), 4,4'-diphenylmethane diisocyanate (MDI), hexamethylene diisocyanate (HMDI), isophorone diisocyanate, triphenylmethane diisocyanate, tris(isocyanatophenyl) thiophosphate, lysine ester triisocyanate, 1,8-diisocyanato-4-isocyanatomethyloctane, 1,6,11-undecane triisocyanate, 1,3,6-hexamethylene triisocyanate, bicycloheptane triisocyanate, biuret HMDI, isocyanurate HMDI, trimethylolpropane-TDI (3 mol) adduct, etc. and various mixtures thereof. The crosslinking agent for use in the ester crosslinking method includes, inter alia, polybasic carboxylic acids such as malonic acid, succinic acid, maleic acid, fumaric acid, adipic acid, sebacic acid, phthalic acid, isophthalic acid, terephthalic acid, itaconic acid, trimellitic acid, pyromellitic acid, dimer acids, etc., lower alkyl esters of said polybasic carboxylic acids, such as the corresponding monomethyl esters, dimethyl esters, monoethyl esters, diethyl esters, monopropyl esters, dipropyl esters, monobutyl esters, dibutyl esters, etc., and acid anhydrides of said polybasic carboxylic acids.

The isocyanate crosslinking reaction can be conducted, for example by mixing an isocyanate with the alkylene oxide polymer in an NCO/OH ratio of 1.5 to 0.5 and heating the mixture at 80 to 150° C. for about 1 to 5 hours.

The ester crosslinking reaction (esterification or transesterification) can be conducted, for example by mixing the alkylene oxide polymer with a polybasic carboxylic acid or a lower alkyl ester or anhydride thereof in a functional equivalent ratio of 1:2 through 2:1 and heating the mixture at 120 to 250° C. and $10^{-4}$ to 10 Torr.

The crosslinked acryloyl- or methacryloyl-terminated (hereinafter referred to sometimes as modified) alkylene oxide polymer can be obtained, for example by subjecting an alkylene oxide to addition (ring-opening) polymerization with said active hydrogen compound and, then, subjecting the resulting polymer to esterification reaction with acrylic or methacrylic acid or to reaction with acryl or methacryl acid chloride with the elimination of hydrochloric acid for introduction of an acryloyl or methacryloyl group into the polymer terminal, followed by crosslinking by a suitable crosslinking method. The above polymer can also be obtained by reacting the terminal of the alkylene oxide polymer with an isocyanate compound such as 2,4-tolylene diisocyanate, 2,6-tolylene diisocyanate, 4,4'-diphenylmethane diisocyanate, hexamethylene diisocyanate or isophorone diisocyanate, then reacting the reaction product further with hydroxyethyl acrylate or hydroxyethyl methacrylate to introduce an acryloyl or methacryloyl group at the terminal and finally crosslinking the modified polymer by a suitable crosslinking method.

The method for crosslinking such an acryloyl- or methacryloyl-terminated alkylene oxide polymer includes irradiation with actinic rays such as ultraviolet light, visible light, electron beam, etc. as well as heating. If necessary, a photopolymerization initiator such as trimethylsilylbenzophenone, benzoin, 2-methylbenzoin, 4-methoxybenzophenone, 1-hydroxycyclohexyl phenyl ketone, 2,2-dimethoxy-2-phenylacetophenone, benzoin methyl ether, anthraquinone, etc. or a polymerization initiator such as benzoyl peroxide, peroxidized methyl ethyl ketone, etc., can be advantageously employed.

The electrically conductive polymer composition of the present invention can be produced, for example by dissolving components (A) and (B) in a common solvent such as dimethyl sulfoxide, dimethylformamide, N-methyl-2-pyrrolidone or the like, heating the solution to remove the solvent to give an alloy and doping the same with component (C). From solubility consideration, N-methyl-2-pyrrolidone is a preferred solvent.

Where the component (B) to be used is a crosslinked alkylene oxide polymer, the desired composition can be obtained by dissolving said component (A), alkylene oxide polymer and crosslinking agent in a common solvent, such as dimethyl sulfoxide, dimethylformamide or N-methyl-2-pyrrolidone, heating the solution for solvent removal and crosslinking to give an (A)–(B) alloy, and finally doping this alloy with component (C).

Where the component (B) to be used is a crosslinked acryloyl- or methacryloyl-terminated alkylene oxide polymer, the composition of the invention can be obtained by dissolving said component (A) and modified alkylene oxide polymer in a common solvent, such as dimethyl sulfoxide, dimethylformamide or N-methyl-2-pyrrolidone, heating the solution for solvent removal and crosslinking to give an (A)–(B) alloy and finally doping this alloy with component (C). of course, crosslinking by irradiation with actinic rays may be carried out during, before or after solvent removal.

The mixing of components (A) and (B) can be advantageously carried out with an ordinary mixer, homogenizer or the like.

The proportions of components (A) and (B) in the electrically conductive polymer composition of the present invention are not particularly limited and may vary according to the intended use of the composition. If the proportion of component (B) exceeds 70% by weight, the resulting electrically conductive polymer composition may develop surface tackiness but even then the composition can be utilized in secondary cell devices without any serious disadvantage.

The electrically conductive polymer composition may also be obtained by doping component (A) and/or component (B) with component (C) beforehand and, then, admixing them.

Thus, the component (A) polyaniline in the ordinary doped state is insoluble in solvents but when the neat polyaniline in the dedoped state is treated with a reducing agent such as hydrazine, phenylhydrazine or hydrazine hydrochloride and, then, doped with an electron acceptor such as tetracyanoquinodimethane (TCNQ), chloranil or tetracyanoethylene, there is obtained an electrically conductive polyaniline which, even in the doped state, is soluble in solvents. Therefore, when such an electron acceptor-doped polyaniline is employed, doping after formation of the alloy need not be carried out. Moreover, when the dedoped polyaniline or its reduced form is used as component (A), the alloy formed can be easily doped by dipping it in a protonic acid such as perchloric acid, sulfuric acid, p-toluenesulfonic acid or the like. Furthermore, the electrochemical doping method may also be employed.

Furthermore, since the alkylene oxide polymer or a crosslinking product thereof is alloyed as component (B) in the electrically conductive polymer composition, this (optionally crosslinked) alkylene oxide polymer segment can be doped with an alkali metal salt or alkaline earth metal salt. It is also possible to dope the alkylene oxide polymer or acryloyl- or methacryloyl-terminated version thereof with such a salt prior to alloying or, alternatively, effect doping with a solution of such salt after formation of said alloy.

There is no particular limitation on the type of alkali metal salt or alkaline earth metal salt which can be used for the doping of component (B). Generally preferred are LiI, LiCl, LiClO$_4$, LiSCN, LiBF$_4$, LiAsF$_6$, LiCF$_3$SO$_3$, LiCF$_3$CO$_2$, LiHgI$_3$, NaI, NaSCN, NaBr, CaCl$_2$, Ca(SCN)$_2$, Ca(ClO$_4$)$_2$ and so on.

Prior doping of said alkylene oxide polymer or acryloyl- or methacryloyl-terminated alkylene oxide polymer can be carried out by dissolving said alkali metal salt or alkaline earth metal salt and said alkylene oxide polymer or acryloyl- or methacryloyl-terminated alkylene oxide polymer in a common solvent such as acetone, methanol, tetrahydrofuran or the like and removing the solvent by distillation. Doping after formation of said alloy can be advantageously carried out by dipping the alloy in a solution of said alkali metal salt or alkaline earth metal salt in a solvent.

Since the electrically conductive polymer composition of the present invention contains polymer chains showing electronic and ionic conductivities within its structure, it can be used advantageously as the electrode material for secondary electric batteries. If necessary, it is possible to design the composition so that it will selectively exhibit either electronic conductivity or ionic conductivity.

Since components (A) and (B) are fully compatible, they form a polymer alloy having an interpenetrating polymer network (IPN) which exhibits a high degree of flexibility which cannot be realized in a film composed exclusively of component (A).

Thus, the electrically conductive polymer composition of the present invention provides a choice of electronic conductivity and/or ionic conductivity according to the intended application. Moreover, because it is highly processable and flexible, the composition finds application in a variety of uses.

Meanwhile, with the recent trend towards miniaturization and reduced thickness and weight of electronic devices, similar requirements have been imposed on the electric cells used as their power sources, too. Particularly, in the field of lithium secondary cells which offer high voltages, cells using an electrochemically active conductive polymer material such as polypyrrole, polyaniline or polyacetylene as the positive electrode material are attracting attention as power sources promising to fulfil the above requirements. Among these cells, the cell using polyaniline as the positive electrode material is gathering attention as a cell offering a large discharge capacity and a long cycle life.

However, the conventional polyaniline secondary cell has the disadvantage that although a device with a small discharge current, e.g. several mA, functions more or less satisfactorily, a secondary cell device with a discharge current of tens to hundreds of mA, if designed, would present the problem that this positive electrode material does not provide a sufficiently large capacity commensurate with its increased size. This is generally attributable to the fact that when a large capacity cell is designed, the thickness of the positive electrode must be large and, hence, the diffusion of the electrolyte anion into the positive electrode material becomes rate-determining.

A further object of the present invention is to overcome the above drawbacks of the conventional positive electrode material and provide a secondary electric cell with a high capacity and a high energy density.

The secondary cell according to this invention comprises, as its positive electrode active material, an electrically conductive polymer composition comprising (A) a polyaniline, (B) at least one member selected from the class consisting of the homopolymers, block copolymers and random copolymers of alkylene oxide monomers and the crosslinking products thereof; and (C) at least one member selected from the class consisting of protonic acid anions, alkali metal salts and alkaline earth metal salts.

In the electrically conductive polymer composition, which is used as the positive electrode active material for the secondary cell according to the invention, said components (A) and (B) have been molecularly dispersed to form a polymer alloy which has then been doped with said component (C). Since this is tantamount to saying that the positive electrode active material and the electrolyte have been molecularly dispersed, which in turn suggests a minimum of interfacial resistance and a rapid diffusion of the anion, both a large capacity and a high energy density are realized in the secondary cell of the invention.

The polyaniline used as component (A) in this invention is the same as the polyaniline mentioned hereinbefore in the description of the first aspect of the invention which is directed to the electrically conductive polymer composition. However, particularly in the non-aqueous secondary cell, the reduced polyaniline obtainable by reducing the dedoped polyaniline with a reducing agent such as hydrazine, phenylhydrazine or hydrazine hydrochloride is preferably employed.

The alkylene oxide polymer or crosslinked alkylene oxide polymer which is used as component (B) is a homopolymer, block copolymer or random copolymer of alkylene oxide monomer or a crosslinking product thereof and is the same as the one described hereinbefore in connection with the first aspect of the present invention.

The production of the electrically conductive polymer composition for use as the positive electrode material in this invention may also comprise the steps of forming an (A)–(B) alloy and doping the alloy with component (C) or, alternatively, the steps of doping component (A) and/or component (B) and mixing them.

As described above, the method for production of the electrically conductive polymer composition for use as the positive electrode material in this invention has a high degree of freedom. Among the several versions of the method, the process comprising dissolving a reduced polyaniline, for component (A), and an alkylene oxide polymer, for component (B), in a common solvent, then either coating the solution on an appropriate base or support material or dipping the base in the solution, heating the resulting coat to dry and give an (A)–(B) alloy film and dipping the alloy film in an alkali metal salt bath for doping is advantageous to obtain an electrically conductive polymer composition suitable for use as the positive electrode material. As an alternative, a crosslinking agent may be added immediately after dissolution of components (A) and (B) in a common solvent so as to allow the alkylene oxide polymer to cure in the subsequent drying step. The electrically conductive polymer composition obtained by this process is also suitable for use as the positive electrode material.

The proportion of component (A) in the electrically conductive polymer composition for use as the positive electrode material in the practice of this invention is 20 to 95% by weight and preferably 30 to 90% by weight. The proportion of component (B) is 5 to 80% by weight and preferably 10 to 70% by weight. The amount of component (C), based on the weight of the (A)–(B) alloy, is preferably 0.01 to 20% by weight.

As the negative electrode material for the secondary cell of this invention, polyacetylene, polythiophene, lithium metal, lithium-aluminum alloy or the like is preferably employed.

The electrolyte that is interposed between the electrodes may for example be a liquid electrolyte obtainable by dissolving an appropriate salt, such as LiI, LiCl, LiClO$_4$, LiSCN, LiBF$_4$, LiAsF$_6$ or LiCF$_3$SO$_3$, in a liquid medium, for example an organic solvent such as propylene carbonate, α-butyrolactone, ethylene carbonate, tetrahydrofuran, dimethyl sulfoxide or dioxolane, or a liquid low molecular weight polyethylene oxide or polypropylene oxide or a copolymer thereof. The electrolyte may also be an ionically conductive solid polymer electrolyte obtainable by dissolving the above-mentioned salt in a high molecular weight substance, such as polyethylene oxide, polypropylene oxide, polyethylene sulfide, poly- β-propiolactone, polyethylene succinate, etc. and crosslinking products thereof.

In the secondary cell of this invention, the electrically conductive polymer composition obtainable by dispersing a polyaniline and an alkylene oxide polymer or a crosslinking product thereof molecularly to give a polymer alloy and doping this alloy with an alkali metal salt or the like is used as the positive electrode material. Substantially speaking, therefore, the positive electrode active material and the electrolyte are present as molecularly dispersed in this cell and since this implies a minimum of interfacial resistance and a rapid diffusion of the anion, both a large capacity and a high energy density are realized in the secondary cell of the invention.

Furthermore, since the polymer alloy composed of polyaniline and polymeric alkylene oxide or crosslinked polymeric alkylene oxide as used in this invention yields a film of excellent mechanical strength on removal of the solvent from its solution by heating or the like, it contributes greatly to the dependability of the positive electrode.

Therefore, the secondary cell of this invention has a large capacity and a high energy density. Furthermore, the positive electrode material for the secondary cell of this invention can be manufactured by a simple procedure such as coating, the manufacturing process is less complicated as compared with the manufacture of the prior art positive electrode materials which involves compression molding and other procedures.

Meanwhile, with the recent demand for reduced size, thickness and weight of electronic devices, capacitors for use in circuits are also required to be smaller in size.

The conventional aluminum foil electrolytic capacitor for use as a large capacity device employs an electrolyte but because of its poor high frequency characteristics and risk of electrolyte leakage, it cannot be surface-mounted and is difficult to build into a chip.

Recently, a solid electrolyte capacitor has been implemented by using an electrically conductive complex of 7,7,8,8-tetracyanoquinodimethane as a substitute for the electrolyte solution and marked improvements have been achieved in high frequency characteristics. However, this complex is not satisfactory in solder dip resistance and cannot be easily built into a chip.

More recently, a solid electrolyte capacitor utilizing polypyrrole, an electrically conductive substance, has been proposed and implemented (Japanese Kokai Patent Publication No. 63-158829). This capacitor comprises an electrically conductive precoating layer deposited on an anodized film which is an insulator and, as superimposed thereon, an electrically conductive polypyrrole layer formed by electrolytic polymerization. Moreover, to simplify the manufacturing process, there has been proposed a technique which employs a solvent-soluble polyaniline in lieu of said polypyrrole and constructs an electrically conductive polymeric layer by coating (Japanese Kokai Patent Publication No. 3-35516).

These capacitors are satisfactory in performance, showing low high-frequency impedance and high heat resistance. However, as problems they share in common because of the use of an electronically conductive polymer as the solid electrolyte, they are poor in the capability to reoxidize defective parts of the anodized film and thereby reduce the leak current (hereinafter referred to as self-repairing action). Moreover, the aging process required following fabrication of a capacitor is sometimes a time-consuming process and the product yield is poor.

The object of this invention is to overcome the above-mentioned drawbacks of capacitors utilizing an electrically conductive polymer as the solid electrolyte and provide a solid electrolyte capacitor with improved high frequency characteristics, high dependability and good self-repairing action.

The solid electrolyte capacitor according to this invention comprises an anodized layer of an oxide film-forming metal and, as disposed thereon, a solid electrolyte layer formed from an electrically conductive polymer composition comprising (A) a polyaniline;
(B) at least one member selected from the class consisting of the homopolymers, block copolymers and random copolymers of alkylene oxide monomers and the crosslinking products thereof;
(C) at least one member selected from the class consisting of protonic acid anions, alkali metal salts, alkaline earth metal salts and organic salts.

In the electrically conductive polymer composition to be used as the solid electrolyte in the solid electrolyte capacitor of this invention, said components (A) and (B) have been molecularly dispersed to form a polymer alloy which has then been doped with said component (C).

This electrically conductive polymer composition exhibits high electronic conductivity when component (A) has been doped with component (C) and is ionically conductive when component (B) has been doped with component (C). Therefore, when both components (A) and (B) have been doped with component (C), the electrically conductive polymer composition is electronically and ionically conductive. When such an electrically conductive polymer composition is used as the solid electrolyte, its electronic conductivity contributes to its electrical conductivity for the most part, while its ionic conductivity contributes to its rapid self-repairing action.

The polyaniline used as component (A) in this invention is the same as the polyaniline mentioned hereinbefore in the description of the invention directed to the electrically conductive polymer composition.

The alkylene oxide polymer or the crosslinking product thereof, which is used as component (B), is the same as that described in connection with the invention directed to the electrically conductive polymer composition, thus being selected from the class consisting of the homopolymer, block copolymer and random copolymer of monomeric alkylene oxide and the corresponding crosslinked polymers.

The method for producing the electrically conductive polymer composition for use as the solid electrolyte layer in this invention may also comprise the steps of preparing an (A)–(B) alloy and doping the alloy with component (C) or, alternatively, the steps of doping component (A) and/or component (B) with component (C) and mixing them.

There is no particular limitation on the kind of alkali metal salt, alkaline earth metal salt or organic salt to be used for the doping of component (B). The preferred species of alkali metal or alkaline earth metal salt include lithium iodide, lithium chloride, lithium perchlorate, lithium thiocyanate, lithium tetraborofluoride, lithium trifluoromethanesulfonate, sodium iodide, sodium thiocyanate, sodium bromide, magnesium perchlorate, calcium perchlorate and so on. The preferred organic salts are ammonium adipate, ammonium benzoate, ammonium azelate and so on.

As will be seem from the foregoing description, the method for producing the electrically conductive polymer solid electrolyte of the present invention features a high degree of freedom. In this solid electrolyte, the proportion of component (A) is 20 to 98% by weight and preferably 50 to 95% by weight and that of component (B) is 2 to 80% by weight and preferably 5 to 50% by weight. The preferred proportion of component (C) relative to the (A)–(B) alloy is 0.01 to 20% by weight.

The cathode of the solid electrolyte capacitor of the invention may for example be a dielectric oxide film formed on aluminum or tantalum which is a valve metal.

The method for manufacture of the solid electrolyte capacitor of this invention may for example comprise preparing an (A)–(B) alloy solution as described hereinbefore, depositing the solution on the dielectric oxide film by dipping or coating, heating the same to form a film and finally doping the film with component (C).

The solid electrolyte capacitor of this invention has an excellent self-repairing action and a low high frequency impedance, thus being of an unprecedentedly high performance.

DETAILED DESCRIPTION OF THE PREFERRED EMBODIMENTS

Examples of synthesis of polyaniline are presented below.

Example of Synthesis 1
Synthesis of Dedoped Polyaniline

A 1-liter four-necked flask fitted with a stirrer, thermometer, cooling condenser and drip funnel was charged with 20 g of aniline, 18 ml of hydrochloric acid and 250 ml of water. After cooling to 0° C., a solution of 49 g of ammonium persulfate in 120 g of water was added dropwise over 4 hours. The mixture was then stirred for an additional 1 hour and the precipitate was recovered by filtration, rinsed and washed with methanol until the washings became clear. Then, this solid was dispersed in 500 ml of 4N aqueous ammonia and stirred for 4 hours. The solid was then recovered by filtration, rinsed until the aqueous washings became neutral, and washed with methanol until the washings became clear. The solid was recovered by filtration and dried in vacuo to give 10.2 g of dedoped polyaniline which was dark brown in color. This product was soluble in N-methyl-2-pyrrolidone.

Example of Synthesis 2
Synthesis of Reduced Form of Dedoped Polyaniline

In 98 g of N-methyl-2-pyrrolidone was dissolved 2 g of the dedoped polyaniline obtained in Example of Synthesis 1, followed by addition of 0.8 g of phenylhydrazine. After completion of the reaction, the reaction product was precipitated from acetone and the precipitate was recovered by filtration, washed with acetone and dried. In this manner, 1.6 g of the title polyaniline, gray in color, was obtained.

Examples of synthesis of alkylene oxide polymers are presented below.

Example of Synthesis 3
Synthesis of Alkylene Oxide Polymer B-1

A 5-liter autoclave was charged with 212 g of diethylene glycol, 4 g of potassium hydroxide as the catalyst and 1,788 g of ethylene oxide and the addition polymerization reaction was conducted at 120° C. for 8 hours. The reaction product was desalted to give 1,950 g of an ethylene oxide homopolymer with a number average molecular weight of 1,000 (calculated from the hydroxyl value).

Example of Synthesis 4
Synthesis of Alkylene Oxide Polymer B-2

A 5-liter autoclave was charged with 212 g of diethylene glycol, 12 g of potassium hydroxide as the catalyst, 1,894 g of ethylene oxide and 1,894 g of propylene oxide and the addition polymerization reaction was then conducted at 120° C. for 8 hours. The reaction product was desalted to give 3,980 g of an ethylene oxide-propylene oxide random copolymer with a number average molecular weight of 4,000 (calculated from the hydroxyl value).

Example of Synthesis 5
Synthesis of Alkylene Oxide Polymer B-3

A 5-liter autoclave was charged with 368 g of glycerol, 4.8 g of potassium hydroxide as the catalyst and 2,032 g of ethylene oxide and the addition polymerization reaction was conducted at 120° C. for 8 hours and, then, purified by desalting. In this manner, 2,390 g of an ethylene oxide homopolymer with a number average molecular weight of 600 (calculated from the hydroxyl value) was obtained.

Example of Synthesis 6
Synthesis of Alkylene Oxide Polymer B-4

A 5-liter autoclave was charged with 184 g of glycerol, 12.0 g of potassium hydroxide as the catalyst and 3,816 g of ethylene oxide and the addition polymerization reaction was conducted at 130° C. for 4 hours and, then, purified by desalting. In this manner, 3,940 g of an ethylene oxide homopolymer with a number average molecular weight of 2,000 (calculated from the hydroxyl value) was obtained.

Example of Synthesis 7
Synthesis of Alkylene Oxide Polymer B-5

A 5-liter autoclave was charged with 92 g of glycerol, 9 g of potassium hydroxide as the catalyst, 2,326 g of ethylene oxide and 581 g of propylene oxide and the addition polymerization reaction was conducted at 120° C. for 8 hours and, then, purified by desalting. In this manner, 2,994 g of an ethylene oxide-propylene oxide random copolymer with a number average molecular weight of 3,000 (calculated from the hydroxyl value) was obtained.

Example of Synthesis 8
Synthesis of Alkylene Oxide Polymer B-6

A 10-liter autoclave was charged with 92 g of glycerol, 10 g of potassium hydroxide as the catalyst, 2,454 g of ethylene oxide and 2,454 g of propylene oxide and the addition polymerization reaction was conducted at 120° C. for 8 hours and, then, purified by desalting. In this manner, 4,990 g of an ethylene oxide-propylene oxide random copolymer with a number average molecular weight of 5,000 (calculated from the hydroxyl value) was obtained.

Example of Synthesis 9
Synthesis of Alkylene Oxide Polymer B-7

A 10-liter autoclave was charged with 92 g of glycerol, 21 g of potassium hydroxide as the catalyst, 1,382 g of ethylene oxide and 5,526 g of propylene oxide and the addition polymerization reaction was conducted at 120° C. for 8 hours and, then, purified by desalting. In this manner, 6,990 g of an ethylene oxide-propylene oxide random copolymer with a number average molecular weight of 7,000 (calculated from the hydroxyl value) was obtained.

Example of Synthesis 10
Synthesis of Alkylene Oxide Polymer B-11

A 5-liter autoclave was charged with 182 g of sorbitol, 9 g of potassium hydroxide as the catalyst and 1,409 g of ethylene oxide and the reaction was conducted at 120° C. for 4 hours. Then, 1,409 g of 1,2-epoxybutane was added and the reaction was further continued at 120° C. for 7 hours, followed by desalting. In this manner, 2,990 g of an ethylene oxide-1,2-epoxybutane block copolymer with a number average molecular weight of 3,000 (calculated from the hydroxyl value) was obtained.

Examples of the alkylene oxide polymers which can be employed in accordance with this invention are shown in Table 1.

TABLE 1

| Polymer No. | Active hydrogen compound | Alkylene oxide monomer* (weight ratio) | | | | Type of polymer | | | Number average molecular weight |
|---|---|---|---|---|---|---|---|---|---|
| | | EO | PO | EB | EH | Homo | Block | Random | |
| B-1 | Diethylene glycol | 100 | | | | ○ | | | 1,000 |
| B-2 | Diethylene glycol | 50 | 50 | | | | | ○ | 4,000 |
| B-3 | Glycerol | 100 | | | | ○ | | | 600 |
| B-4 | Glycerol | 100 | | | | ○ | | | 2,000 |
| B-5 | Glycerol | 80 | 20 | | | | | ○ | 3,000 |
| B-6 | Glycerol | 50 | 50 | | | | | ○ | 5,000 |
| B-7 | Glycerol | 20 | 80 | | | | | ○ | 7,000 |
| B-8 | Sorbitol | 20 | 80 | | | | | ○ | 10,000 |
| B-9 | Sorbitol | | | 100 | | ○ | | | 1,000 |
| B-10 | Sorbitol | | | | 100 | ○ | | | 20,000 |
| B-11 | Sorbitol | 50 | | 50 | | | ○ | | 3,000 |

*EO: ethylene oxide
PO: propylene oxide
EB: 1,2-epoxybutane
EH: 1,2-epoxyhexane

In the following examples and comparative examples, the measurement of electric conductivity was performed by the complex impedance method and the DC 4-terminal method.

EXAMPLE 1

In 9.5 g of N-methyl-2-pyrrolidone was dissolved 0.5 g of the polyaniline powder obtained in Example of Synthesis 1, followed by addition of 0.5 g of the alkylene oxide polymer B-3 obtained in Example of Synthesis 5 with stirring to prepare a homogeneous solution. This solution was cast on a glass sheet and dried at 150° C. for 30 minutes to give a self-supporting film with a shakudo-colored gloss. This film was immersed in a 20% aqueous solution of p-toluenesulfonic acid for 24 hours. The film was then rinsed, washed with acetone and dried to give a self-supporting film with a deep blue color.

The electrical conductivity of this film, which was electronic, was 2 S/cm and the frequency dependence of electric conductivity was low. The film had a tensile strength of 650 kgf/cm$^2$ and an elongation of 110%.

EXAMPLE 2

In 9.5 g of N-methyl-2-pyrrolidone was dissolved 0.5 g of the polyaniline powder obtained in Example of Synthesis 2, followed by addition of 0.002 g of 7,7,8,8-tetracyanoquinodimethane (TCNQ). Then, 0.2 g of the alkylene oxide polymer B-1 obtained in Example of Synthesis 3 was added and stirred well to dissolve. This solution was cast on a glass sheet and dried at 160° C. for 30 minutes to give a self-supporting film having a deep blue color.

The electrical conductivity of this film, which was electronic, was 0.5 S/cm, with substantially no frequency dependence of electrical conductivity (10 Hz ~200 KHz). The film had a tensile strength of 810 kgf/cm$^2$ and an elongation of 60%.

EXAMPLE 3

In N-methyl-2-pyrrolidone was dissolved 0.5 g of the polyaniline powder obtained in Example of Synthesis 1, followed by addition of alkylene oxide polymer B-5 previously doped with lithium perchlorate (doping was performed by dissolving 0.05 g of lithium perchlorate in 1 g of methanol, adding 0.45 g of the alkylene oxide polymer B-5 obtained in Example of Synthesis 7, and after thorough mixing, distilling the methanol off) and the mixture was stirred well to dissolve. This solution was cast on a glass plate and dried at 150° C. for 30 minutes to give a self-supporting film with a deep blue gloss.

The electrical conductivity of this film at room temperature was 10$^{-5}$ S/cm and the temperature-dependence of electrical conductivity was the WLF (Williams-Landel-Ferry) dependence characteristic of ionic conductance.

This film was immersed in 10% HClO$_4$ solution for 10 hours, after which it washed with methanol and dried to give a flexible self-supporting film with a deep. blue color. This film exhibited an electronic conductivity of 4S/cm and an ionic conductivity of 10$^{-5}$ S/cm. The film had a tensile strength of 710 kgf/cm$^2$ and an elongation of 95%.

EXAMPLE 4

To a solution of 0.005 g of TCNQ in 9.5 g of N-methyl-2-pyrrolidone was added 0.5 g of the polyaniline powder obtained in Example of Synthesis 2, followed by addition of 0.4 g of alkylene oxide polymer B-7 previously doped with 0.05 g of lithium perchlorate in the same manner as Example 3. After dissolution under stirring, the resulting solution was cast on a glass sheet and dried at 150° C. for 30 minutes to give a self-supporting film with a deep blue gloss. This film exhibited an electronic conductivity of 0.9 S/cm and an ionic conductivity of 10$^{-4}$ S/cm. The film had a tensile strength of 680 kgf/cm$^2$ and an elongation of 80%.

EXAMPLE 5

In 9.5 g of N-methyl-2-pyrrolidone was dissolved 0.5 g of the polyaniline powder obtained in Example of Synthesis 1, followed by addition of 0.4 g of alkylene oxide polymer B-11 previously doped with 0.06 g of sodium perchlorate as in Example 3, with stirring. The resulting solution was cast on a glass sheet and dried at 150° C. for 30 minutes to give a self-supporting film with a deep blue color.

The electrical conductivity of this film at room temperature was 10$^{-5}$ S/cm. The film exhibited ionic conductance.

EXAMPLE 6

In 9.5 g of N-methyl-2-pyrrolidone was dissolved 0.5 g of the polyaniline powder obtained in Example of Synthesis 1. To this solution was added 0.5 g of the alkylene oxide polymer B-6 obtained in Example of Synthesis 8 and the mixture was stirred well. The resulting solution was cast on a glass sheet and dried at 150° C. for 30 minutes to give a self-supporting film with a deep blue color. This film was immersed in a 10% aqueous solution of perchloric acid containing 5% of lithium perchlorate for 10 hours, at the end of which time it was rinsed, washed with methanol and dried.

This film showed an electronic conductivity of 2.5 S/cm and an ionic conductivity of 10$^{-5}$ S/cm. The film had a tensile strength of 660 kgf/cm$^2$ and an elongation of 105%.

Comparative Example 1

In 9.5 g of N-methyl-2-pyrrolidone was dissolved 0.5 g of the polyaniline powder obtained in Example of Synthesis 1. This solution was cast on a glass sheet and dried at 150° C. for 30 minutes to prepare a film with a shakudo-colored gloss. This film was immersed in a 20% aqueous solution of p-toluenesulfonic acid for 24 hours. The film was then rinsed, washed with acetone and dried to give a self-supporting film with a deep blue color.

The electrical conductivity of this film, which was electronic, was 2.2 S/cm. The film had a tensile strength of 680 kgf/cm$^2$ and an elongation of 2%.

The above film was immersed in 10 g of methanol containing 2 g of lithium perchlorate for 24 hours, after which time it was rinsed, washed with acetone and dried. The electrical conductivity of this film was measured but no ionic conductivity was found.

EXAMPLE 7

In 9.5 g of N-methyl-2-pyrrolidone was dissolved 0.5 g of the polyaniline powder obtained in Example of Synthesis 1. To this solution were added the alkylene oxide polymer B-2 (0.5 g) obtained in Example of Synthesis 4 and hexamethylene diisocyanate in an NCO/OH ratio of 1.0, followed by stirring to dissolve them. The solution thus obtained was cast on a glass sheet and cured at 150° C. for 30 minutes to prepare a self-supporting film with a deep blue gloss. This film was immersed in a 20% aqueous solution of p-toluenesulfonic acid for 24 hours. The immersed film was rinsed, washed with acetone and dried to give a self-supporting film with a deep blue color.

The electrical conductivity of this film, which was electronic, was 1 S/cm and the frequency dependence of electrical conductivity was low. The film had a tensile strength of 710 kgf/cm$^2$ and an elongation of 170%.

EXAMPLE 8

In 9.5 g of N-methyl-2-pyrrolidone was dissolved 0.5 g of the polyaniline powder obtained in Example of Synthesis 2, followed by addition of 0.002 g of TCNQ. Then, 0.2 g of the alkylene oxide polymer B-1 obtained in Example of Synthesis 3, 8 mg of dimethyl terephthalate and one drop of 1% aqueous lithium hydroxide solution were added and the mixture was stirred well to dissolve. This solution was cast on a glass sheet and the resulting film was cured at 0.1 Torr and 160° C. for 60 minutes to give a self-supporting film with a deep blue color.

The electrical conductivity of this film, which was electronic, was 0.3 S/cm and the frequency dependence of electrical conductivity was negligible (10 Hz ~200 KHz). The film had a tensile strength of 600 kgf/cm$^2$ and an elongation of 93%.

EXAMPLE 9

In N-methyl-2-pyrrolidone was dissolved 0.5 g of the polyaniline powder obtained in Example of Synthesis 1, followed by addition of 0.05 g of lithium perchlorate, 0.5 g of the alkylene oxide polymer B-5 obtained in Example of Synthesis 7 and a sufficient amount of 2,4-tolylene diisocyanate to make an NCO/OH ratio of 1 and the mixture was stirred to dissolve. This solution was cast on a glass sheet and dried at 150° C. for 30 minutes to give a self-supporting film with a deep blue gloss. The electrical conductivity of this film was 10$^{-5}$ S/cm at room temperature and the temperature dependence of electrical conductivity was the WLF dependance characteristic of ionic conductance.

The above film was immersed in 10% HClO$_4$ solution for 10 hours, after which it was washed with methanol and dried to give a flexible self-supporting film with a deep blue color. The film exhibited an electronic conductivity of 3 S/cm and an ionic conductivity of 10$^{-5}$ S/cm. The film had a tensile strength of 600 kgf/cm$^2$ and an elongation of 123%.

EXAMPLE 10

To a solution of 0.005 g of TCNQ in 9.5 g of N-methyl-2-pyrrolidone was added 0.5 g of the polyaniline powder obtained in Example of Synthesis 2. On the other hand, to the alkylene oxide polymer B-7 obtained in Example of Synthesis 9 was added 2,6-tolylene diisocyanate in an NCO/OH ratio of 1 and the crosslinking reaction was conducted at 120° C. for 40 minutes, at the end of which time 0.04 g of lithium perchlorate was added as a dopant. A 0.4 gram portion of this crosslinked alkylene oxide polymer was added and dissolved in the above polyaniline solution with stirring. This solution was cast on a glass sheet and dried at 150° C. for 30 minutes to give a self-supporting film with a deep blue gloss.

This film exhibited an electronic conductivity of 0.3 S/cm and an ionic conductivity of 10$^{-4}$ S/cm. The film had a tensile strength of 580 kgf/cm$^2$ and an elongation of 120%.

EXAMPLE 11

In 9.5 g of N-methyl-2-pyrrolidone was dissolved 0.5 g of the polyaniline powder obtained in Example of Synthesis 1, followed by addition of the alkylene oxide polymer B-11 previously doped with sodium perchlorate (prepared by dissolving 0.06 g of sodium perchlorate in 1 g of methanol, adding 0.4 g of the alkylene oxide polymer B-11 obtained in Example of Synthesis 10 thereto with stirring to give a homogeneous solution, and finally removing the methanol by distillation) and isophorone diisocyanate in an NCO/OH ratio of 1 with stirring to give a solution. This solution was cast on a glass sheet and dried at 150° C. for 30 minutes to give a self-supporting film with a deep blue gloss. The film exhibited an ionic conductivity of 10$^{-5}$ S/cm at room temperature.

EXAMPLE 12

In 9.5 g of N-methyl-2-pyrrolidone was dissolved 0.5 g of the polyaniline powder obtained in Example of Synthesis 1, followed by addition of 0.5 g of the alkylene oxide polymer B-6 obtained in Example of Synthesis 8 and 2,4-tolylene diisocyanate in an NCO/OH ratio of 1 with stirring. The resulting solution was cast on a glass sheet and dried at 150° C. for 30 minutes to prepare a self-supporting film with a deep blue color. This film was immersed in a 10% aqueous solution of perchloric acid containing 5% of lithium perchlorate for 10 hours, after which time it was rinsed, washed with methanol and dried.

This film exhibited an electronic conductivity of 1.3 S/cm and an ionic conductivity of 10$^{-5}$ S/cm. The film had a tensile strength of 600 kgf/cm$^2$ and an elongation of 130%.

Examples of synthesis of acryloyl- or methacryloyl-terminated alkylene oxide polymers are presented below.

Example of Synthesis 11

Synthesis of Acryloyl-terminated Alkylene Oxide Polymer B-12

A 5-liter autoclave was charged with 212 g of diethylene glycol, 4 g of potassium hydroxide as the catalyst and 1,788 g of ethylene oxide and the addition polymerization reaction was conducted at 120° C. for 8 hours and the reaction product was purified by desalting to give 1,950 g of an ethylene oxide homopolymer with a number average molecular weight of 1,000 (calculated from the hydroxyl value).

Then, a reactor was charged with 1,000 g of the above polymer, 180 g of acrylic acid, 2,000 g of toluene and, as the catalyst, 10 g of sulfuric acid and the mixture was refluxed with constant stirring and removal of water for 10 hours. The reaction mixture was then neutralized and desalted to give 1,050 g of an acryloyl-terminated ethylene oxide polymer.

Example of Synthesis 12

Synthesis of Acryloyl-terminated Alkylene Oxide Polymer B-13

A 5-liter autoclave was charged with 212 g of diethylene glycol, 12 g of potassium hydroxide as the catalyst, 1,894 g of ethylene oxide and 1,894 g of propylene oxide and the addition polymerization reaction was conducted at 120° C. for 8 hours and, then, desalted to give 3,980 g of an ethylene oxide-propylene oxide random copolymer with a number average molecular weight of 4,000 (calculated from the hydroxyl value).

A reactor was charged with 1,000 g of the above polymer, 43.3 g of acrylic acid, 2,000 g of toluene and, as the catalyst, 10 g of sulfuric acid and the mixture was reacted and after-treated as in Example of Synthesis 11 to give 1,015 g of an acryloyl-terminated ethylene oxide-propylene oxide random copolymer.

Example of Synthesis 13

Synthesis of Acryloyl-terminated Alkylene Oxide Polymer B-15

A 5-liter autoclave was charged with 184 g of glycerol, 12.0 g of potassium hydroxide as a catalyst and 3,816 g of ethylene oxide and the addition polymerization reaction was conducted at 130° C. for 4 hours. The reaction product was then desalted to give 3,940 g of an ethylene oxide homopolymer with a number average molecular weight of 2,000 (calculated from the hydroxyl value).

Then, a reactor was charged with 1,000 g of the above polymer, 130 g of acrylic acid, 2,000 g of toluene and, as the catalyst, 10 g of sulfuric acid and the mixture was reacted and treated as in Example of Synthesis 11 to give 1,040 g of an acryloyl-terminated ethylene oxide polymer.

Example of Synthesis 14

Synthesis of Acryloyl-terminated Alkylene Oxide Polymer B-16

A 5-liter autoclave was charged with 92 g of glycerol, 9 g of potassium hydroxide as a catalyst, 2,326 g of ethylene oxide and 581 g of propylene oxide and the addition polymerization reaction was conducted at 120° C. for 8 hours and, then, desalted to give 2,994 g of an ethylene oxide-propylene oxide random copolymer with a number average molecular weight of 3,000 (calculated from the hydroxyl value).

A reactor was charged with 1,000 g of the above polymer, 87 g of acrylic acid, 2,000 g of toluene and, as the catalyst, 10 g of sulfuric acid and the mixture was reacted and after-treated as in Example of Synthesis 11 to give 1,030 g of an acryloyl-terminated ethylene oxide-propylene oxide random copolymer.

Example of Synthesis 15

Synthesis of Acryloyl-terminated Alkylene Oxide Polymer B-17

A 10-liter autoclave was charged with 92 g of glycerol, 10 g of potassium hydroxide as a catalyst, 2,454 g of ethylene oxide and 2,454 g of propylene oxide and the addition polymerization reaction was conducted at 120° C. for 8 hours and the reaction product was purified by desalting to give 4,990 g of an ethylene oxide-propylene oxide random copolymer with a number average molecular weight of 5,000 (calculated from the hydroxyl value).

Then, a reactor was charged with 1,000 g of the above polymer, 52 g of acrylic acid, 2,000 g of toluene and, as the catalyst, 10 g of sulfuric acid and the mixture was reacted and after-treated as in Example of Synthesis 11 to give 1,010 g of an acryloyl-terminated ethylene oxide-propylene oxide random copolymer.

Example of Synthesis 16

Synthesis of Methacryloyl-terminated Alkylene Oxide Polymer B-18

A 10-liter autoclave was charged with 92 g of glycerol, 21 g of potassium hydroxide as a catalyst, 1,382 g of ethylene oxide and 5,526 g of propylene oxide and the addition polymerization reaction was conducted at 120° C. for 8 hours and, then, desalted to give 6,990 g of an ethylene oxide-propylene oxide random copolymer with a number average molecular weight of 7,000 (calculated from the hydroxyl value).

Then, a reactor was charged with 1,000 g of the above polymer, 44 g of methacrylic acid, 2,000 g of toluene and, as the catalyst, 10 g of sulfuric acid and the mixture was reacted and after-treated as in Example of Synthesis 11 to give 1,005 g of a methacryloyl-terminated ethylene oxide-propylene oxide random copolymer.

Example of Synthesis 17

Synthesis of Acryloyl-terminated Alkylene Oxide Polymer B-22

A 5-liter autoclave was charged with 182 g of sorbitol, 9 g of potassium hydroxide as a catalyst and 1,409 g of ethylene oxide and the polymerization reaction was conducted at 120° C. for 4 hours. Then, 1,409 g of 1,2-epoxybutane was introduced and the reaction was further continued at 120° C. for 7 hours. The reaction product was then purified by desalting to give 2,990 g of an ethylene oxide-1,2-epoxybutane block copolymer with a number average molecular weight of 3,000 (calculated from the hydroxyl value).

Then, a reactor was charged with 1,000 g of the above polymer, 173 g of acrylic acid, 2,000 g of toluene and, as the catalyst, 10 g of sulfuric acid and the mixture was reacted and after-treated as in Example of Synthesis 11 to give 1,050 g of an acryloyl-terminated ethylene oxide-1,2-epoxybutane block copolymer.

The following is a partial list of the acryloyl and methacryloyl-terminated alkylene oxide polymers which can be used in accordance with the invention.

TABLE 2

| Polymer No. | Active hydrogen compound | Alkylene oxide monomer[*1] (weight ratio) | | | | Type of Polymer | | | Number average molecular weight | [*2] Terminal-modifying group |
|---|---|---|---|---|---|---|---|---|---|---|
| | | EO | PO | EB | EH | Homo | Block | Random | | |
| B-12 | Diethylene | 100 | | | | ○ | | | 1,000 | A |
| B-13 | Diethylene glycol | 50 | 50 | | | | | ○ | 4,000 | A |
| B-14 | Glycerol | 100 | | | | ○ | | | 600 | A |
| B-15 | Glycerol | 100 | | | | ○ | | | 2,000 | A |
| B-16 | Glycerol | 80 | 20 | | | | | ○ | 3,000 | A |
| B-17 | Glycerol | 50 | 50 | | | | | ○ | 5,000 | A |
| B-18 | Glycerol | 20 | 80 | | | | | ○ | 7,000 | M |
| B-19 | Sorbitol | 20 | 80 | | | | | ○ | 10,000 | M |
| B-20 | Sorbitol | | | 100 | | ○ | | | 1,000 | A |
| B-21 | Sorbitol | | | | 100 | ○ | | | 20,000 | A |
| B-22 | Sorbitol | 50 | | 50 | | | ○ | | 3,000 | A |

[*1]EO: ethylene oxide
PO: propylene oxide
EB: 1,2-epoxybutane
EH: 1,2-epoxyhexane
[*2]A: acryloyl
M: methacryloyl

EXAMPLE 13

In 9.5 g of N-methyl-2-pyrrolidone was dissolved 0.5 g of the polyaniline powder obtained in Example of Synthesis 1, followed by addition of 0.5 g of the acryloyl-terminated alkylene oxide polymer B-13 obtained in Example of Synthesis 12 and 0.001 g of benzoyl peroxide with stirring to prepare a homogeneous solution. This solution was cast on a glass sheet and dried at 150° C. for 30 minutes to give a self-supporting film with a deep blue gloss. This film was immersed in a 20% aqueous solution of p-toluenesulfonic acid for 24 hours. The film was then rinsed, washed with acetone and dried to give a self-supporting film with a deep blue color.

The electrical conductivity of this film, which was electronic, was 2.1 S/cm and the frequency dependence of electrical conductivity was low. The film had a tensile strength of 820 kgf/cm$^2$ and an elongation of 250%.

EXAMPLE 14

In 9.5 g of N-methyl-2-pyrrolidone was dissolved 0.5 g of the polyaniline powder obtained in Example of Synthesis 2, followed by addition of 0.002 g of TCNQ. To this solution were further added 0.2 g of the acryloyl-terminated alkylene oxide polymer B-12 obtained in Example of Synthesis 11 and 0.001 g of benzoyl peroxide with stirring to prepare a homogeneous solution. This solution was cast on a glass sheet and cured at 160° C. for 60 minutes to give a self-supporting film with a deep blue color.

The electrical conductivity of this film, which was electronic, was 0.8 S/cm and the frequency dependence of electrical conductivity was virtually absent (10 Hz~200 KHz). The film had a tensile strength of 890 kgf/cm$^2$ and an elongation of 105%.

EXAMPLE 15

In N-methyl-2-pyrrolidone was dissolved 0.5 g of the polyaniline powder obtained in Example of Synthesis 1, followed by addition of 0.05 g of lithium perchlorate, 0.5 g of the acryloyl-terminated alkylene oxide polymer B-16 obtained in Example of Synthesis 14 and 0.002 g of benzoyl peroxide with stirring to prepare a homogeneous solution. This solution was cast on a glass sheet and dried at 150° C. for 30 minutes to give a self-supporting film with a deep blue gloss.

The electrical conductivity of this film at room temperature was 10$^{-5}$ S/cm and the temperature dependence of electrical conductivity was the WLF dependence characteristic of ionic conductance.

The above film was immersed in 10% HClO$_4$ solution for 10 hours. The film was then washed with methanol and dried to give a flexible self-supporting film with a deep blue color. The electrical conductivity of this film exhibited an electronic conductivity of 2.3 S/cm and an ionic conductivity of 10$^{-5}$ S/cm. The film had a tensile strength of 780 kgf/cm$^2$ and an elongation of 195%.

EXAMPLE 16

In 9.5 g of N-methyl-2-pyrrolidone was dissolved 0.005 g of TCNQ followed by addition of 0.5 g of the polyaniline powder obtained in Example of Synthesis 2. Separately, 0.005 g of 2-methylbenzoin was added to 0.5 g of the methacryloyl-terminated alkylene oxide polymer B-18 obtained in Example of Synthesis 16 and the crosslinking reaction was carried out by ultraviolet irradiation at the intensity of 7 mW/cm$^2$. This crosslinked polymer was further doped with 0.04 g of lithium perchlorate to give a methacryloyl-terminated crosslinked alkylene oxide polymer. A 0.4 g portion of this modified polymer was added and dissolved in the polyaniline solution prepared above, with stirring. This solution was cast on a glass sheet and dried at 150° C. for 30 minutes to give a self-supporting film with a deep blue gloss.

This film exhibited an electronic conductivity of 0.5 S/cm and an ionic conductivity of 10$^{-4}$ S/cm. The film had a tensile strength of 920 kgf/cm$^2$ and an elongation of 180%.

EXAMPLE 17

In 9.5 g of N-methyl-2-pyrrolidone was dissolved 0.5 g of the polyaniline powder obtained in Example of Synthesis 1, followed by addition of acryloyl-terminated alkylene oxide polymer B-22 previously doped with sodium perchlorate (prepared by dissolving 0.06 g of. sodium perchlorate in 1 g of methanol, adding 0.4 g of the acryloyl-terminated alkylene oxide polymer obtained in Example of Synthesis 17 with stirring to give a homogenous solution and removing the methanol by distillation) and 0.004 g of 4-methoxybenzophenone to give a solution. This solution was cast on a glass sheet, irradiated with ultraviolet light at 7 mW/cm$^2$, and dried at 150° C. for 30 minutes to prepare a self-supporting film with a deep blue gloss.

The electrical conductivity of this film, which was ionic, was 10$^{-5}$ S/cm at room temperature.

EXAMPLE 18

In 9.5 g of N-methyl-2-pyrrolidone was dissolved 0.5 g of the polyaniline powder obtained in Example of Synthesis 1, followed by addition of 0.5 g of the acryloyl-terminated alkylene oxide polymer B-17 obtained in Example of Synthesis 15, and the mixture was stirred well. The solution was cast on a glass sheet, irradiated with an electro-curtain type electron beam irradiator (200 KV, 5 Mrad) for crosslinking and dried at 150° C. for 30 minutes to prepare a self-supporting film with a deep blue color. This film was immersed in a 10% aqueous solution of perchloric acid containing 5% of lithium perchlorate for 10 hours, after which it was rinsed, washed with methanol and dried.

The above film exhibited an electronic conductivity of 1.3 S/cm and an ionic conductivity of 10$^{-5}$ S/cm. The film had a tensile strength of 600 kgf/cm$^2$ and an elongation of 130%.

EXAMPLE 19

In 9.5 g of N-methyl-2-pyrrolidone were dissolved 0.5 g of the reduced polyaniline obtained in Example of Synthesis 2 and the alkylene oxide polymer B-4 obtained in Example of Synthesis 6 to prepare a homogeneous solution. This solution was coated on a stainless steel mat (1 cm in diameter) and dried at 150° C. for 30 minutes. After drying, the coated mat was immersed in a solution of LiBF$_4$ in methanol (2 moles/liter) for 20 hours and, then, dried at 80° C. and 10$^{-2}$ Torr for 10 hours to give a positive electrode material.

Figure 1:
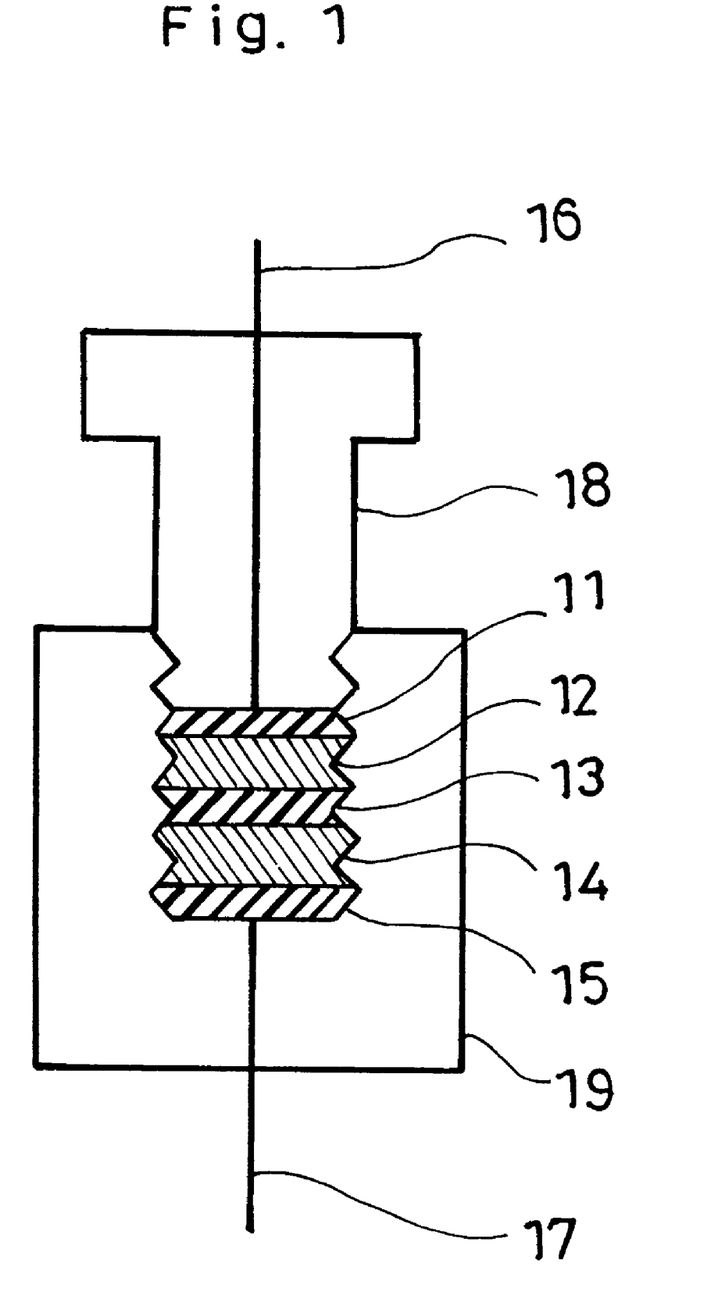
FIG. 1 is a schematic view illustrating the test cell used in the evaluation of characteristics of the secondary electric cell of the invention.

Using the above material for the positive electrode, a porous polypropylene film as the separator, a lithium foil for the negative electrode, and a solution of LiBF4 in propylene carbonate (3 moles/liter) for the electrolyte, the test cell illustrated in FIG. 1 was fabricated and the cell characteristic was measured by repeated charge-discharge with a constant current of 5 mA/cm$^2$.

In FIG. 1, the collectors are shown at 11 and 15, the positive electrode at 12, the separator and electrolyte at 13, the negative electrode at 14, the positive pole lead at 16, the negative pole lead at 17, and containers made of polytetrafluoroethylene at 18 and 19.

EXAMPLE 20

Except that tolylene diisocyanate was added to the N-methyl-2-pyrrolidone solution in an NCO/OH (OH in alkylene oxide polymer) ratio of 1 in preparing the positive electrode material, the procedure of Example 19 was repeated and the cell characteristic was evaluated.

EXAMPLE 21

Except that the alkylene oxide polymer B-6 obtained in Example of Synthesis 8 was used in an amount of 0.2 g in preparing the positive electrode material, the procedure of Example 19 was repeated and the cell characteristic was evaluated.

EXAMPLE 22

Except that 0.5 g of the dedoped polyaniline obtained in Example of Synthesis 1 and 0.6 g of alkylene oxide polymer B-7 previously doped with 0.05 g of $LiClO_4$ were used in preparing the positive electrode material, the procedure of Example 19 was repeated and the cell characteristic was evaluated.

Comparative Example 2

Except that a polyaniline electrode prepared by electrolytic polymerization in an aqueous solution containing 1 mole/ℓ of aniline and 2 moles/ℓ of $HBF_4$ with a constant current of 2 $mA/cm^2$ using a stainless steel mat as the electrode was used as the positive electrode material, the procedure of Example 19 was repeated and the cell characteristic was determined.

Comparative Example 3

Except that 15 mg of the reduced polyaniline obtained in Example of Synthesis 2 was pressed into a film at 100 $kg/cm^2$ and the film was used as the positive electrode material, the procedure of Example 19 was repeated and the cell characteristic was determined.

The results of cell evaluations in Examples 19 to 22 and Comparative Examples 2 and 3 are presented below in Table 3.

TABLE 3

Results of evaluation

|  | Example | | | | Comparative Example | |
| --- | --- | --- | --- | --- | --- | --- |
|  | 19 | 20 | 21 | 22 | 2 | 3 |
| Discharge capacity (mAh) | 40 | 25 | 31 | 28 | 7 | 3 |

EXAMPLE 23

In 9.0 g of N-methyl-2-pyrrolidone were dissolved 0.9 g of the dedoped polyaniline obtained in Example of Synthesis 1 and 0.1 g of the alkylene oxide polymer B-4 obtained in Example of Synthesis 6 to prepare a homogeneous solution. In this solution was immersed a positive electrode foil (anode area 1 $cm^2$, capacitance in liquid 1 $\mu F$) prepared by forming a dielectric oxide film on a 50 $\mu m$ thick etched aluminum foil and providing the foil with a positive pole lead for 3 minutes.

After being removed from the solution, the positive electrode foil was dried at 150° C. for 10 minutes to remove the solvent. As a result, a blue purple film was formed on the positive electrode foil.

This positive electrode foil was immersed in an aqueous solution containing 10% of p-toluenesulfonic acid and 10% of ammonium adipate for 5 hours. The foil removed from the solution was rinsed, washed with methanol and dried at 80° C. for 3 hours. Then, a negative pole lead was formed with a silver paste to provide a solid electrolyte capacitor.

A direct current potential of 20V was applied to this capacitor and the time to reach a leakage current value of $\leq 1$ $\mu A$, cell capacity and 100 KHz equivalent series resistance were determined.

EXAMPLE 24

A homogeneous solution was prepared from 0.8 g of the dedoped polyaniline obtained in Example of Synthesis 1, 0.05 g of lithium perchlorate, 0.2 g of the alkylene oxide polymer B-7 obtained in Example of Synthesis 9 and a sufficient amount of 2,4-tolylene diisocyanate to make an NCO/OH ratio of 1. Then, a thin film was formed on a positive electrode foil as in Example 23 and the foil was immersed in a 10% aqueous solution of p-toluenesulfonic acid for 5 hours.

Then, a solid electrolyte capacitor was fabricated and its performance was tested as in Example 23.

EXAMPLE 25

The procedure of Example 23 was repeated except that the alkylene oxide polymer B-2 obtained in Example of Synthesis 4 was employed and a solid electrolyte capacitor was fabricated. The performance of this capacitor was evaluated as in Example 23.

EXAMPLE 26

The procedure of Example 23 was repeated except that 0.5 g of the dedoped polyaniline obtained in Example of Synthesis 1 and 0.5 g of the alkylene oxide polymer B-6 obtained in Example of Synthesis 8 were employed and a solid electrolyte capacitor was similarly fabricated. The performance of this capacitor was evaluated as in Example 23.

Comparative Example 4

In 9.0 g of N-methyl-2-pyrrolidone was dissolved 1.0 g of the dedoped polyaniline obtained in Example of Synthesis 1 to prepare a homogenous solution.

Using this solution, a thin film was formed on a positive electrode foil, which was then immersed in a 10% aqueous solution of p-toluenesulfonic acid for 5 hours, as in Example 23. Thereafter, a solid electrolyte capacitor was fabricated as in Example 23.

The performance of the above capacitor was evaluated in the same manner as Example 23.

Comparative Example 5

In methyl ethyl ketone were dissolved 1.0 g of the alkylene oxide polymer B-4 obtained in Example of Synthesis 6 and 0.05 g of lithium perchlorate, followed by addition of a sufficient amount of 2,4-tolylene diisocyanate to make an NCO/OH ratio of 1 to prepare a homogeneous solution. A positive electrode foil similar to the one used in Example 23 was immersed in the above solution and the foil was then heated at 80° C. for 3 hours for solvent removal and crosslinking to thereby form a colorless clear film on the positive electrode foil. Using a silver paste, a negative pole lead was secured to the positive electrode foil to fabricate a solid electrolyte capacitor. The performance of this capacitor was evaluated in the same manner as described in Example 23.

The results of performance evaluation of the solid electrolyte capacitors fabricated in Examples 23 to 26 and Comparative Examples 4 and 5 are presented in Table 4.

TABLE 4

| | Time to reach a leakage current of ≦1 μA | Capacity (μF) | Equivalent series resistance (mΩ/100 KHz) |
|---|---|---|---|
| Example 23 | 10 seconds | 0.98 | 40 |
| Example 24 | 10 seconds | 0.97 | 50 |
| Example 25 | 7 seconds | 0.99 | 60 |
| Example 26 | 3 seconds | 1.01 | 60 |
| Comparative Example 4 | (did not fall to ≦1 μA) | 0.85 | 50 |
| Comparative Example 5 | 3 seconds | 0.91 | 1250 |

What is claimed is:

1. A solid electrolyte capacitor comprising a dielectric oxide film formed on an anodizable metal and, as disposed thereon, a solid electrolyte layer formed from an electrically conductive polymer composition comprising (A) a polyaniline, (B) at least one member selected from the group consisting of alkylene oxide homopolymers, and block copolymers and random copolymers consisting of alkylene oxide repeating units and crosslinking products thereof, and (C) at least one member selected from the group consisting of protonic acid anions, alkali metal salts, alkaline earth metal salts and organic salts.

* * * * *